Aug. 19, 1930.  L. ATTHENONT  1,773,658
BUILDING MATERIAL AND ITS APPLICATIONS
Filed Jan. 7, 1927  2 Sheets-Sheet 1
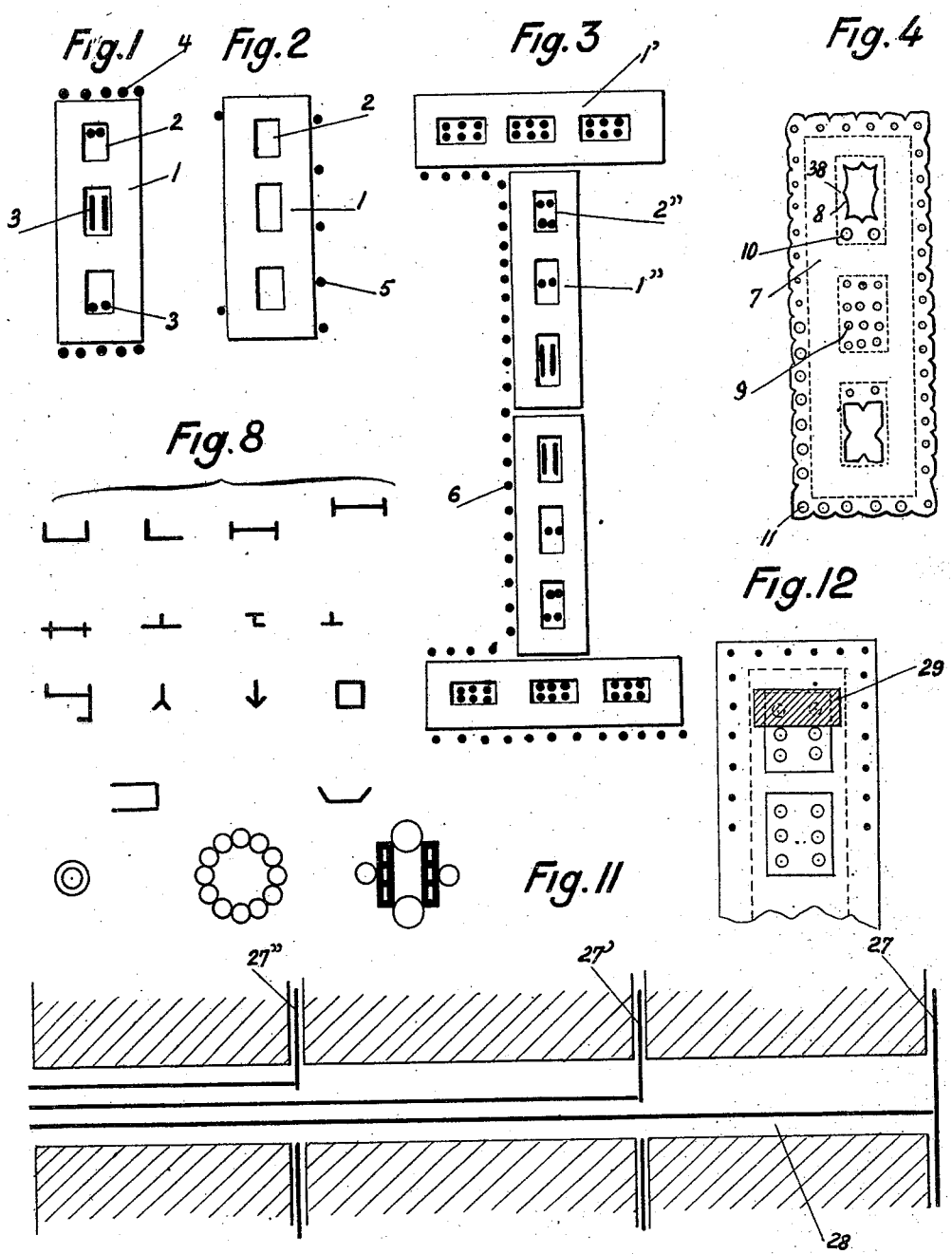

Aug. 19, 1930.   L. ATTHENONT   1,773,658
BUILDING MATERIAL AND ITS APPLICATIONS
Filed Jan. 7, 1927   2 Sheets-Sheet 2
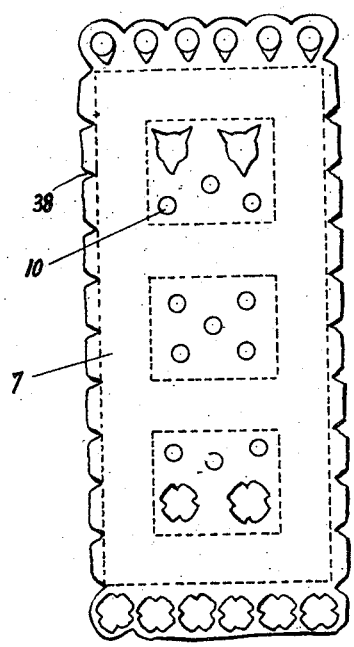
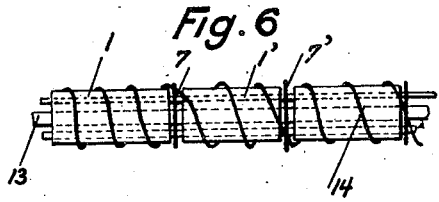
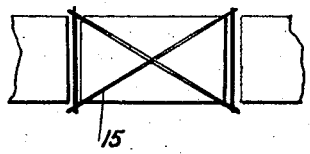
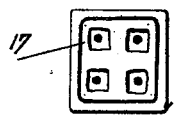
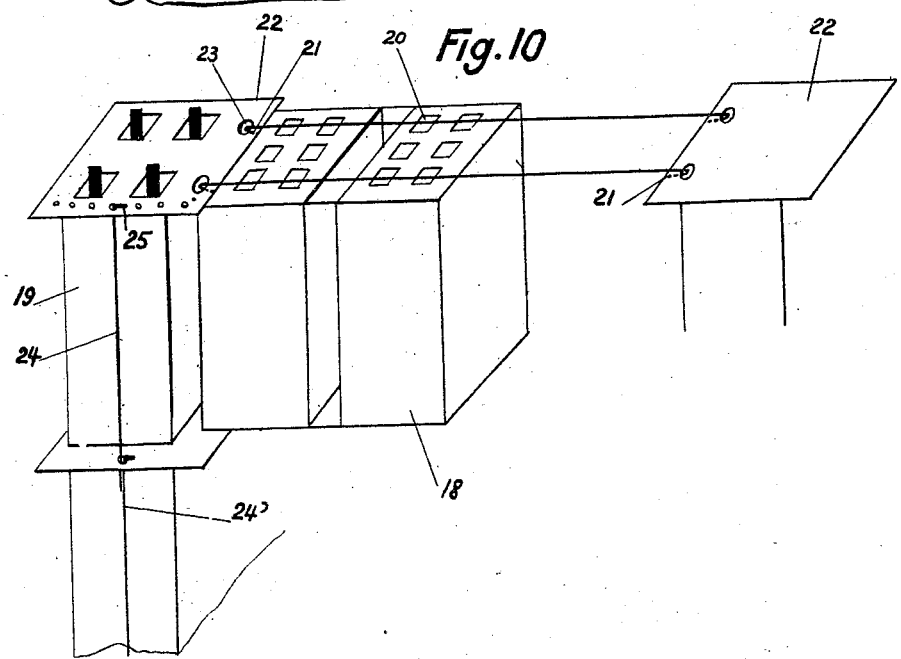
INVENTOR
L. Atthenont Patented Aug. 19, 1930

1,773,658

UNITED STATES PATENT OFFICE

LÉON ATTHENONT, OF VERSAILLES, FRANCE

BUILDING MATERIAL AND ITS APPLICATIONS

Application filed January 7, 1927, Serial No. 159,717, and in France July 27, 1926.

My invention relates to a new building material constituted by a series of hollow bricks or earthenware products of any sort provided with a longitudinal aperture or with outer corrugations and assembled by means of an iron armature disposed inside or outside or both inside and outside the brick elements, the bricks and armature being secured together through a pure cement mortar, rich or very rich or through concrete. This material is adapted for the same uses as concrete, wood, iron, steel, ordinary masonry in any size for which the bricks themselves are adapted.

I have noticed that the three materials, iron, cement or concrete and earthenware, combined according to my invention are adapted to be deformed in a uniform manner thanks to their great adhesion, under stresses superior to that corresponding to the elastic limit of the metal in the case of the above-mentioned mortars and under stresses below the said limit with concrete. This phenomenon allows the usual laws of resistance of materials to be applied to my new material.

The three elementary materials have already been used on a small scale to build partitions which support very small stresses; brick has also been used for filling up the neutral part of concrete beams; special rubblework has also been made and disposed between iron beams embedded or not in cement mortar; but these applications did not take into account the important scientific remark noted hereinabove which is the basis of my invention.

My improved material shows the important advantage of having the properties of a homogeneous material, i. e. it begins cracking only when the armatures are submitted to their limit breaking stress.

Commercially the principal advantages of my novel material are the folowing:

It allows any sort of brick, rubblework, pipe, bushel provided with a longitudinal aperture or with outer corrugations to resist all the stresses resisted by iron, wood or reinforced concrete. It allows vertical building and planking is hardly necessary as in the case of concrete as my improved material carries its own planking. It allows the usual joinings used with iron and wood to be used and an important minimizing of the timberwork which does not require any further reinforcement (a beam of 10 cm. can replace an oak joist of 25 cm. and more). It can be used everywhere, in cities, in countries far from the railroad and rivers wherever brick and clay are found and freight is costly.

Hollow bricks as described can be arranged in a very logical manner. In the beam arrangement, the extreme brick hollows, for instance, may receive the armature (or part thereof) which resists the flexion stresses in a beam constituted with bricks laying on their side. The central brick hollows may receive, when desired, the armature resisting vertical and even horizontal stresses. The small sides and also the top and bottom of the big sides which may be corrugated or not may if the vertical flexion is considered, receive a complementary armature which increases the moment of inertia and the modulus of resistance; one or both big sides, may also receive an armature which plays the same part as to vertical and horizontal flexion or merely a protecting part. Nothing prevents the usual double symmetrical or dissymmetrical armatures being used and also a simple armature on the extended side. The brick may also be reinforced in view of longitudinal shearing stresses and against warping stresses by means of small outer armatures perpendicular to the first mentioned ones and having the shape of bars, stirrups, belts, a continuous winding and the like. These parts, generally binding wires, can be placed inside or outside the outer armature.

Iron sheets can be added in the joints of the bricks beyond which they project or with which they are flush (partly or completely). These sheets are provided with holes for the passage of the irons, the armatures, the mortar or the concrete. Their main object is to resist the horizontal shearing stresses in the beams and the warping stresses due to the lateral flexion of the simple or compound beams. In the latter more dangerous case, the projections on the plates prevent this warping.

The second reason for these armatures concerns their mounting and the joining of the parts by securing the armatures to the bricks. By suitably disposing the projections as to form and to slope and by means of suitable holes, they serve as connections, bearings, stops, squares, sleepers, chains etc., for the adjacent parts belonging or not to the structure. The brick may be sawn easily or made of different lengths whereby the projecting sheets can be disposed at any desired distance. Several can be disposed, complete or not in one same joint with an interposition of mortar or concrete.

I have shown a number of forms of application of my invention by way of example on appended drawings.

Figs. 1 and 2 are cross-sections of ordinary brick provided with different armatures.

Fig. 3 is an end view of a beam comprising four ordinary bricks.

Figs. 4 and 5 are plan views of two large joining plates.

Fig. 6 shows a series of bricks between which are interposed plates.

Fig. 7 is a modification of Fig. 6.

Fig. 8 shows different shapes used for the sections of the plates and bricks connected together.

Fig. 9 shows a brick joint wherein the plate is replaced by a wire.

Fig. 10 is a perspective view of a partition between two parts.

Fig. 11 is a longitudinal section along a channel formed by a series of holes in the bricks constituting a beam.

Fig. 12 is a plan view of a plate whereof several holes are closed.

On Figs. 1 and 2, the bricks 1 are each provided with three longitudinal holes 2. On Fig. 1 these holes are provided with armatures 3 of suitable shape. Moreover rods 4 serve as armatures for the small sides. These armatures are adapted for beams resting on their small side. Fig. 2 shows a brick adapted for ceilings. The holes are not provided with an armature and wires 5 are used as armatures of the long sides, the most reinforced side being adapted to be used as the lower side.

In Fig. 3 the bricks 1' which constitute the webs are provided with round flat or square irons. The holes 2'' of the brick 1'' which are the nearest the webs are preferably provided with round or square irons, the intermediary holes with round irons and those which are the nearest the centre have flat irons or hoop-iron. The outside on the left of the beam and the lower part are provided with wires 6.

The large plates 7 (Figs. 4 and 5) adapted to be inserted in the joints are provided with holes according to the armatures and mortar or concrete. For instance on Fig. 4 the brick holes (shown in dotted lines) cooperate in the plate on one hand with comparatively large apertures 8 adapted to receive flat irons and on the other hand for the central hole of the brick with a series of small holes 9 adapted to receive wires or round irons or even to merely allow a free communication for the liquid mortar.

Similar small holes 10 exist near the holes 8. In that part which projects beyond the brick are provided small holes 11 which receive the outer armatures. As shown on Fig. 5 the holes corresponding to the small sides and the extreme holes may receive round irons; the central holes receive on the contrary hard steel wires. On Fig. 6 the bricks 1, 1' are disposed over the inner armatures 13 and are separated by the plates 7, 7'. The outer armature is constituted by a spiral winding 14. These plates also allow (Fig. 7) to place the two wires 15 forming the armature perpendicularly to each other whereby a sort of trellis-beam is formed on the side of the bricks whereby the total resisting torque is reduced, the sag of the beam or the warping of a part can be reduced.

By giving them a suitable shape, these plates may connect a series of bricks with a view to provide the desired profile (see Fig. 8).

The plates can be replaced by a wire 17 (Fig. 9) in the parts submitted to small stresses, or by iron strips, in long or incurved parts (partitions, vats, etc.).

In these cases they can be replaced by wires connecting the parts together through riveting, binding, clamping, etc.

Fig. 10 shows in perspective a partition formed by bricks 18 and connecting the posts 19. The wires 20 connect by means of the hooks 21 the projecting plates 22 provided with the holes 23.

The continuity of the plates can be applied to the inner and outer armature. Thus in partitions subjected to small stresses (Fig. 10) the irons 24 are interrupted at each horizontal joint and are terminated at their upper end by hooks 25. They extend parallel to the top of the irons 24' of the lower brick.

The plates inserted in the joints show the further advantage of providing beams of equal resistance. The plates form a succession of horizontal bearings, the beam being supposed vertical. The plates may thus bear a series of bars. It is sufficient for this that they should not be perforated below the said bars or that their perforations should be closed.

Thus on Fig. 11 which is a longitudinal section of a beam resting on a support on the right hand side, the plates 27, 27', 27'' placed in the joints are perforated in a manner such that the longitudinal hole 28 extending throughout the bricks shows only one iron for the brick first from the right, two for the next, three for the second next and so on.

On Fig. 12 a certain number of apertures 29 of the plate have been closed so that the irons abut against the closing means.

What I claim is:

1. A building construction comprising a series of hollow bricks each showing a longitudinal aperture, said bricks being arranged with their apertures in alignment, armatures grouted outwardly to the bricks and a projecting joint plate arranged between adjacent bricks and provided with passages for the armatures.

2. A building construction having the properties of a homogeneous construction comprising a series of hollow bricks each showing a longitudinal aperture, and arranged with their apertures in alignment, armatures passing through the apertures of the bricks and grouted therein, armatures grouted outwardly to the bricks and a projecting joint plate arranged between adjacent bricks and provided with apertures in front of the apertures, the inner armatures of the bricks passing through some of the apertures of the joint plate, other apertures of the joint plate being provided for the passage of grout.

3. A building construction having the properties of a homogeneous construction comprising a series of hollow bricks each showing a plurality of longitudinal apertures, and arranged with their apertures in alignment, armatures passing through the apertures of the bricks and grouted therein, armatures grouted outwardly to the bricks and a projecting joint plate arranged between adjacent bricks and provided with apertures in front of the apertures of the bricks and with passages for the outer armatures, the inner armatures of the bricks passing through some of the apertures of the joint plate, the other apertures of the joint plate being provided for the passage of grout.

4. A building construction having the properties of a homogeneous construction comprising a series of hollow bricks each showing a longitudinally aperture, and arranged with their apertures in alignment, armatures passing through the apertures of the bricks and grouted therein, armatures grouted outwardly to the bricks, a projecting joint plate arranged between adjacent bricks and provided with apertures in front of the apertures of the bricks and with passages for the outer armatures, the inner armatures of the bricks passing through some of the apertures of the joint plate, the other apertures of the joint plate being provided for the passage of grout, and plates disposed at one end of the series of bricks and adapted to serve as abutments for the armatures.

5. A building construction having the properties of a homogeneous construction comprising a series of hollow bricks each showing a longitudinal aperture, and arranged with their apertures in alignment, armatures passing through the apertures of the bricks and grouted therein, spirally wound, armatures grouted outwardly to the bricks and a projecting joint plate arranged between adjacent bricks and provided with apertures in front of the apertures of the bricks and with passages for the outer armatures, the inner armatures of the bricks passing through some of the apertures of the joint plate, other apertures of the joint plate being provided for the passage of grout.

6. A building construction having the properties of a homogeneous construction comprising a series of hollow bricks each showing a plurality of longitudinal apertures, and arranged with their apertures in alignment, armatures passing through the apertures of the bricks and grouted therein, armatures grouted outwardly to the bricks, a projecting joint plate arranged between adjacent bricks and provided with apertures in front of the apertures of the bricks and with passages for the outer apertures, the inner armatures of the bricks passing through some of the apertures of the joint plate, other apertures of the joint plate being provided for the passage of grout, and small plates adapted to cover the ends of such brick apertures as are devoid of armatures.

7. A building construction comprising a series of hollow bricks each showing a longitudinal aperture, said bricks being arranged with their apertures in alignment, armatures grouted outwardly to the bricks, a projecting joint plate arranged between adjacent bricks and provided with passages for the armatures, and cement bonds connecting together the several elementary parts of the construction.

8. A building construction having the properties of a homogeneous construction comprising a series of hollow bricks each showing a plurality of longitudinal apertures, and arranged with their apertures in alignment, armatures passing through the apertures of the bricks and grouted therein, armatures grouted outwardly to the bricks, a projecting joint plate arranged between adjacent bricks and provided with apertures in front of the apertures of the bricks and with passages for the outer armatures, the inner armatures of the joint plate, passing through some of the apertures of the point plate, the other apertures of the joint plate being provided for the passage of grout, and cement bonds connecting together the several elementary parts of the construction.

In testimony whereof I have signed my name to this specification.

LÉON ATTHENONT.